Denis R. Tanguy
INVENTOR.

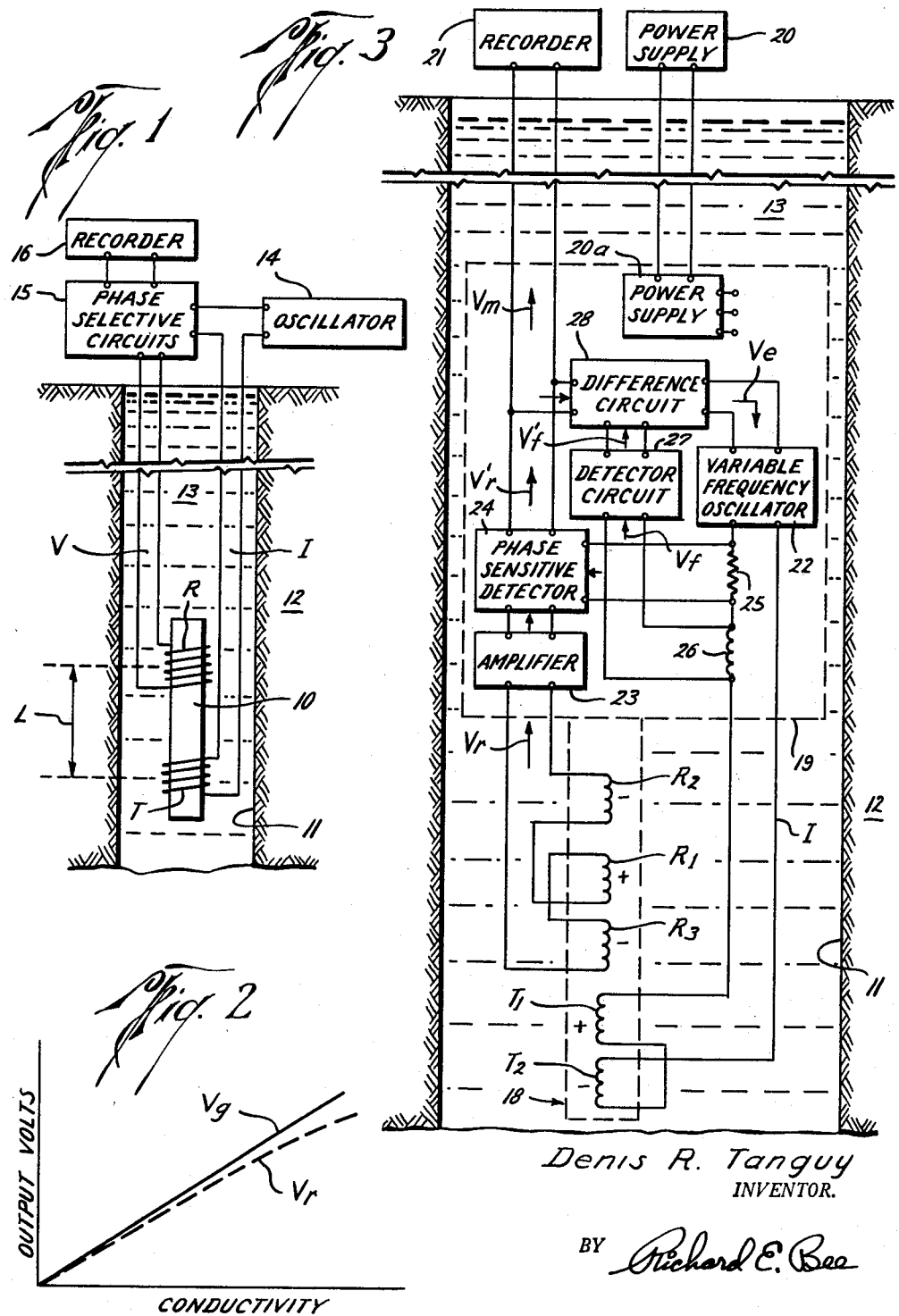

BY Richard E. Bee
ATTORNEY

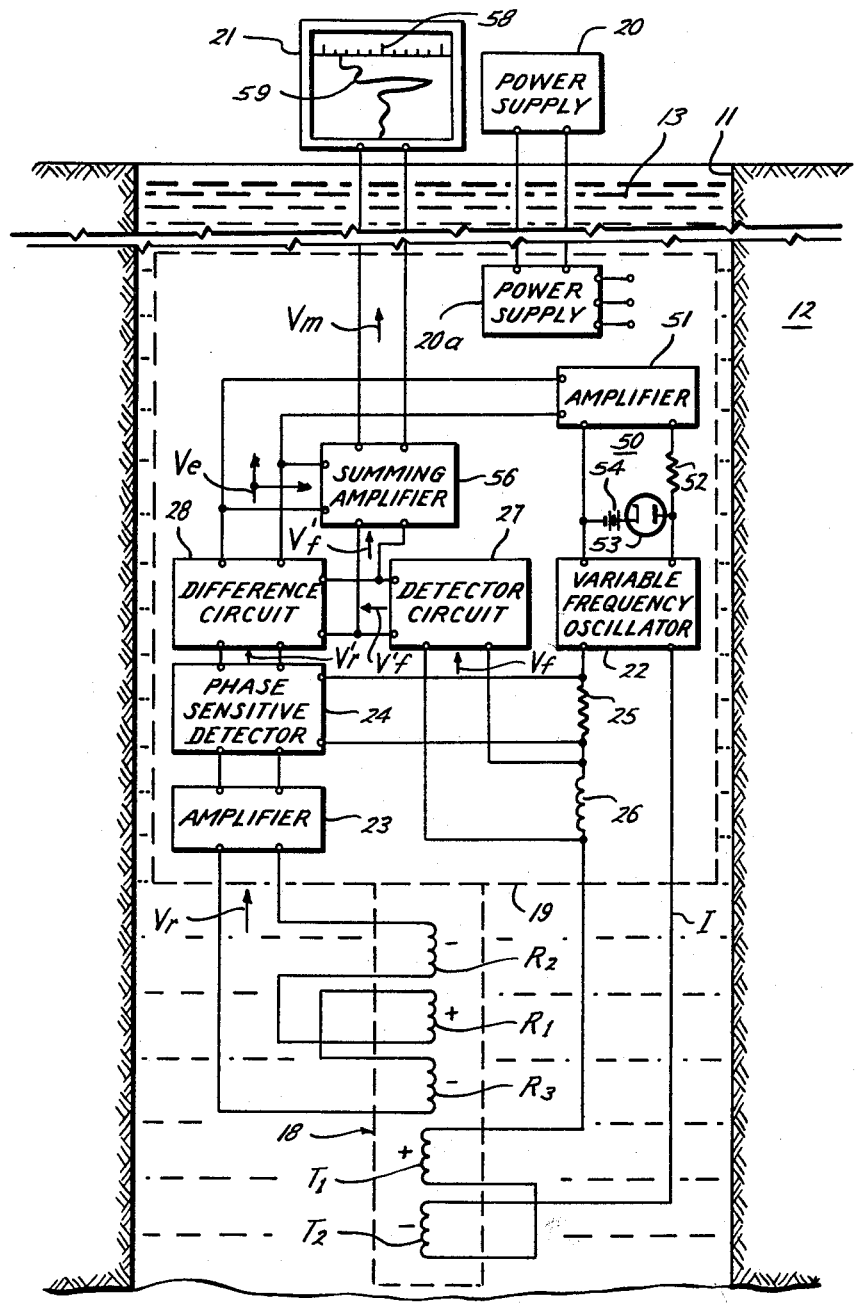

United States Patent Office 3,119,061
Patented Jan. 21, 1964

3,119,061
METHODS AND APPARATUS FOR INVESTIGATING EARTH FORMATIONS WHICH MINIMIZE THE INFLUENCE OF ELECTRICAL SKIN EFFECT
Denis R. Tanguy, Houston, Tex., assignor to Schlumberger Well Surveying Corporation, Houston, Tex., a corporation of Texas
Filed Jan. 21, 1960, Ser. No. 7,738
19 Claims. (Cl. 324—6)

This invention relates to electrical methods and apparatus for investigating subsurface earth formations traversed by a borehole and, particularly, to methods and apparatus of the type wherein the investigation is carried out by causing a flow of alternating current in the formation material being investigated.

It is known to investigate the electrical resistance properties of the various subsurface strata penetrated by a borehole by producing a flow of alternating current in the formation material immediately adjacent the borehole and measuring the manner in which the magnitude of this alternating current or the magnitude of the electromagnetic field associated therewith varies as the current-producing means is moved along the course of the borehole. A problem arises, however, as to the proper frequency to use for the alternating current. If too high of a frequency is utilized, then various undesired effects and nonlinearities enter into the measurements. The use of a higher frequency, on the other hand, frequently tends to improve the accuracy of the measurement and reduce the size and complexity of the apparatus.

This situation is particularly troublesome for the case of induction logging methods and apparatus. Known types of induction logging systems are described in considerable detail in a technical paper by H. G. Doll entitled "Introduction to Induction Logging and Application to Logging of Wells Drilled With Oil Base Mud," which appeared in the June 1949 issue of the Journal of Petroleum Technology. The analytical expressions set forth in this technical paper show that a linear relationship exists between the electrical conductivity value of the formation material being investigated and the magnitude of a voltage component induced in the receiver coil for the case where the magnitude of the transmitter coil energizing current is held constant. It is clearly stated, however, that the analysis which leads to this linear relationship is based on the assumption that the transmitter coil energizing current is of relatively low frequency.

This wisdom of exercising caution in extending this low frequency theory to the case of higher operating frequencies has been borne out by subsequent laboratory tests, field operations and other practical applications. It has, in fact, been found that where high operating frequencies are used, then the relationship between the formation conductivity value and the voltage component induced in the receiver coil becomes nonlinear in nature. This nonlinearity is caused by the so-called electrical "skin effect" phenomena. This "skin effect" phenomena is caused by both self-inductance and mutual interaction between the circulating currents induced in the formation being studied. It denotes a redistribution of the formation current flow in an effort to cause more of the current flow to occur in regions where the effective electrical impedance is less. It is the same type of phenomena which is encountered in the high frequency operation of other types of electrical circuits and devices.

The nonlinearity introduced by this "skin effect" phenomena is relatively complex in nature. In addition to being dependent on the coil system operating frequency, it also depends in a relatively complex manner on the value of hte formation conductivity, the physical construction of the induction logging apparatus and other borehole conditions. Under some conditions and for some forms of construction, the occurrence of "skin effect" is practically nil. Under other circumstances, the "skin effect" phenomena becomes quite significant and substantial errors are introduced into the measurements unless it is taken into account.

Past efforts to minimize or eliminate "skin effect" errors have, among other things, included the use of relatively low operating frequencies. As indicated in the above technical paper by Doll, however, the magnitude of the useful output signal is proportional to the square of the operating frequency. Consequently, a reduction in the operating frequency causes a considerably greater reduction in the magnitude of the output signal. This, in turn, impairs the signal-to-noise ratio, particularly, where relatively low values of formation conductivity are being measured. It also requires the use of greater amounts of signal amplification and greater magnitudes of transmitter coil current in order to obtain reliable signal levels.

Another factor which influences the magnitude of the "skin effect" error is the effective physical length of the coil system. In a simple two-coil system, this length corresponds to the center-to-center spacing between transmitter and receiver coils. The shorter the spacing, the smaller is the relative skin effect error. For other reasons, however, it is frequently undesirable to use short coil spacings. In particular, the greater the coil spacing, the greater is the lateral depth of investigation of the system into the adjacent earth formation. As a rough rule of thumb, the lateral depth of investigation for a two-coil system is approximately equal to one-half the coil spacing. Consequently, it is frequently desirable to use a large coil spacing in order to obtain a more accurate measure of the true resistivity of the uncontaminated portion of the formation, especially where some of the drilling fluid contained in the borehole has invaded a substantial distance into the formation.

These foregoing considerations show that the occurrence of the skin effect phenomena tends to introduce undesired nonlinearities into the operation of an induction logging system. It also places undesirable restraints and limitations on the construction and operation of practical induction logging systems. Thus, in general, it would be highly desirable to overcome the usual effects of this "skin effect" phenomena. If the undesired effects of this phenomena could be overcome, then still other and further benefits could be realized. For example, so-called "computed focusing" techniques could then be applied with greater ease and accuracy to provide induction logging measurements of greatly improved quality.

It is an object of the invention, therefore, to provide new and improved methods and apparatus for measuring the electrical properties of subsurface earth formations penetrated by a borehole.

It is another object of the invention to provide new and improved electrical borehole investigating methods and apparatus for providing output indications which are more linearly related to the electrical property being investigated.

It is a further object of the invention to provide new and improved methods and apparatus for borehole induction logging which considerably minimizes the influence of electrical skin effect on the output signal indications.

It is an additional object of the invention to provide new and improved induction logging apparatus wherein skin effect errors are substantially minimized while, at the same time, the signal-to-noise ratio of the apparatus is substantially increased, particularly under adverse borehole conditions.

It is yet another object of the invention to provide new and improved induction logging apparatus wherein a greater depth of lateral investigation may be provided without fear of introducing excessive nonlinearities and uncertainties due to skin effect.

It is a still further object of the invention to provide new and improved induction logging apparatus wherein computed focusing techniques may be utilized with greater ease and accuracy.

In accordance with the invention, a method of investigating earth formations traversed by a borehole comprises the steps of creating an alternating electromagnetic field in the adjacent earth formation material at a given depth in the borehole and obtaining an indication of the magnitude of this electromagnetic field. The method further includes repeating these first two steps at different depths in the borehole and varying the frequency of the electromagnetic fields as a function of the indicated magnitude thereby to provide indications which are more linearly related to an electrical property of the formation material.

In the particular case of induction logging, this method includes the step of moving an alternating-current energized coil system through the borehole. It also includes the step of obtaining indications of the coil system response to variations in the electrical conductivity of the formations. It further includes the step of varying the frequency of the coil system energizing current inversely to the conductivity variations thereby to provide indications which are less subject to skin effect variations.

For a better understanding of the present invention, together with other and further objects thereof, reference is had to the following description taken in connection with the accompanying drawings, the scope of the invention being pointed out in the appended claims.

Referring to the drawings:

FIG. 1 shows a known type of induction logging system and is used for purposes of explaining the basic theory upon which the present invention is predicated;

FIG. 2 is a graph used in explaining the operation of the FIG. 1 apparatus;

FIG. 3 shows, in a schematic manner, a representative embodiment of an induction logging system constructed in accordance with the principles of the present invention;

FIG. 5 illustrates schematically another embodiment of an induction logging system constructed in accordance with the present invention;

Figure 4:
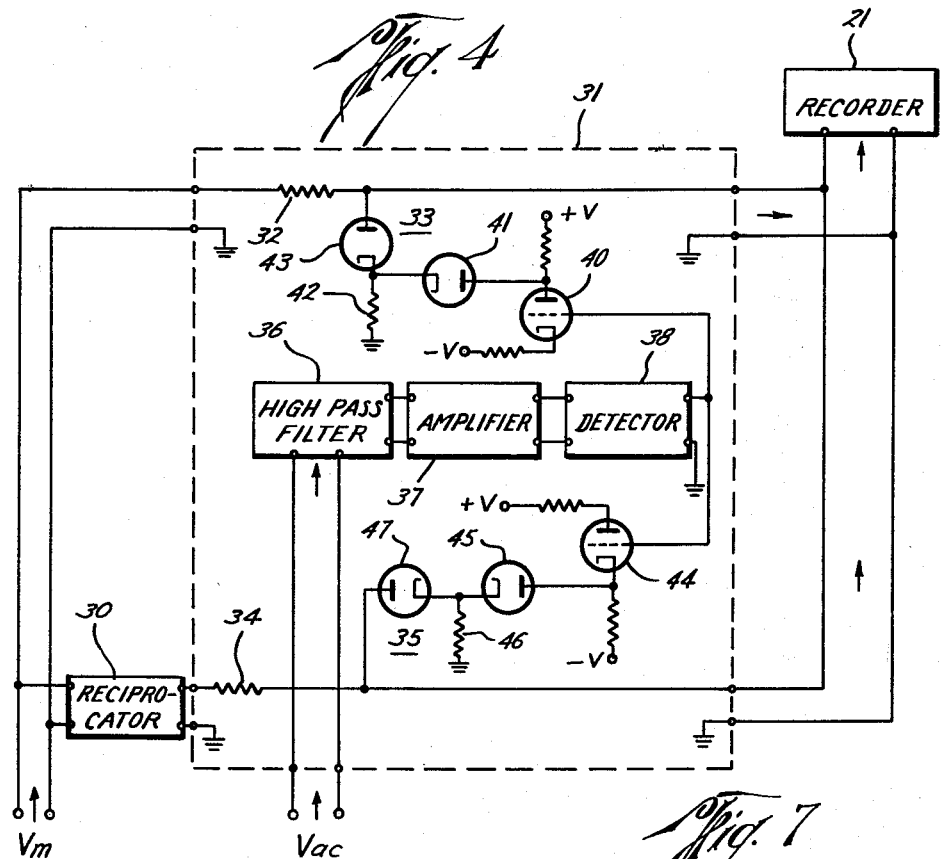
FIG. 4 shows a circuit modification for a portion of the FIG. 3 apparatus.

Before any compensation or correction for the skin effect phenomena can be made, it is necessary to have a thorough understanding of the precise manner in which this phenomena influences the operation of an induction logging system. To this end, reference is made to FIG 1 of the drawings, which shows schematically a known type of induction logging system which is described in greater detail in U.S. Patent No. 2,788,483, granted to H. G. Doll on April 9, 1957. This system of FIG. 1 constitutes a "two-coil" system which includes a transmitter coil T and a receiver coil R, each wound around a support member 10 of nonconductive, nonmagnetic material. Each coil is thus of the cylindrical solenoid type. The spacing between coil centers is denoted by the dimension "L." The support member 10 is adapted to be moved through a borehole 11 to enable investigation of the earth formations 12 adjacent thereto. The borehole 11 is filled with a drilling fluid or drilling mud 13. As indicated in FIG. 1, the center axes of the coils are in line with one another and generally in line with the longitudinal axis of the borehole 11.

As the support member 10 moves through the borehole 11, the transmitter coil T is energized with alternating current "I" supplied by an oscillator 14 located at the surface of the earth. The flow of this alternating current "I" in the transmitter coil T creates an alternating electromagnetic flux field surrounding the transmitter coil. This alternating flux field induces a secondary current flow, commonly referred to as "eddy current," in the formation material 12 adjacent the transmitter coil T. This induced or secondary current, in general, flows around the support member 10 in circular loops which are coaxial with the center axis of the transmitter coil T and, hence, generally coaxial with the center axis of the borehole 11. Where the drilling fluid 13 is of a conductive nature, some secondary current also flows therein.

This flow of secondary current in the earth formation 12 induces a voltage component in the receiver coil R. The magnitude of this voltage component is generally proportional to the magnitude of the secondary current flow which, in turn, is proportional to the conductivity value of the formation material. The greater the formation conductivity, the greater the secondary current flow and, consequently, the greater is this receiver coil voltage component.

There is also induced in the receiver coil R a second voltage component caused by direct flux coupling between the transmitter and receiver coils. This second voltage component is distinguishable from the first voltage component by the fact that it is in "phase quadrature" with, that is, 90° out of phase with, the current "I" flowing in the transmitter coil T. The voltage component resulting from secondary current flow in the earth formation, on the other hand, is more or less "in phase" with the transmitter coil current "I." The total or net voltage signal "V" induced in the receiver coil R is supplied to suitable phase selective circuits 15 located at the surface of the earth. A portion of the transmitter coil current "I" is also supplied to the phase selective circuits 15 to serve as a phase reference signal. Under the control of this phase reference signal, the phase selective circuits 15 operate to pass the desired in-phase voltage component on to a recorder 16, while rejecting the undesired quadrature-phase voltage component. A record is thus provided on the recorder 16 of the manner in which the formation conductivity value varies along the course of the borehole 11. Suitable means (not shown) are utilized to advance the recording medium of recorder 16 in synchronism with the movement of the support member 10 through the borehole 11.

The relationship between the transmitter coil current "I" and the total receiver coil voltage V of the FIG. 1 apparatus is described by the following mathematical expression:

$$V = j\omega M I \qquad (1)$$

where "$j$" denotes the usual vector operator, "$\omega$" denotes the angular frequency ($2\pi f$), and "M" denotes the mutual inductance between the transmitter and receiver coils.

From electromagnetic field theory and, in particular, from the theory concerning magnetic dipoles, it can be shown that the mutual inductance between a pair of coaxial coils located in a homogeneous isotropic medium and spaced apart by a distance greater than the coil dimensions and where one of the coils is energized by a periodic current is described by the following expression:

$$M = \frac{\nu A_t A_r}{2\pi L^3}(1 - j\gamma L) e^{j\gamma L} \qquad (2)$$

where $\nu$ = permeability of the medium.

$A_t$ = product of cross-sectional area times number of coil turns for transmitter coil.

$A_r$ = product of cross-sectional area times number of coil turns for receiver coil.

$L$ = spacing between coil centers.

$\gamma$ = propagation constant of the medium.

Note that Equation 2 does not make any limiting assumptions as to the operating frequency of the coil system.

Where the surrounding medium is of a conductive nature as is the present case, then the propagation constant $\gamma$ is:

$$\gamma = \sqrt{j\omega\sigma\nu} \qquad (3)$$

where "$\sigma$" denotes the electrical conductivity of the medium. This assumes that the medium is sufficiently conductive so that the dielectric constant of the medium may be neglected. More precisely, it assumes that the product of angular frequency times dielectric constant is small compared to the conductivity.

Equation 3 can be rewritten as:

$$\gamma = \frac{1+j1}{\delta} \qquad (4)$$

where "$\delta$" denotes the "skin depth" in the medium. This skin depth $\delta$ represents the effective depth of penetration of the electromagnetic field and is defined as:

$$\delta = \sqrt{\frac{2}{\omega\sigma\nu}} \qquad (5)$$

Note that the skin depth $\delta$ is a function of the formation conductivity $\sigma$ as well as the operating frequency $\omega$.

Expanding Equation 2 by means of a power series gives the following expression for the mutual inductance:

$$M = \frac{\nu A_t A_r}{2\pi L^3}\left[1 - \frac{(j\gamma L)^2}{2} - \frac{(j\gamma L)^3}{3} - \frac{(j\gamma L)^4}{8} - \frac{(j\gamma L)^5}{30}\right] \qquad (6)$$

Substituting the value of $\gamma$ given by Equation 4 into Equation 6 and simplifying gives:

$$M = \frac{\nu A_t A_r}{2\pi L^3}\left[1 + j\left(\frac{L}{\delta}\right)^2 - \frac{2}{3}(1+j)\left(\frac{L}{\delta}\right)^3 + \frac{1}{2}\left(\frac{L}{\delta}\right)^4 - \frac{2}{15}(1-j)\left(\frac{L}{\delta}\right)^5 + \cdots\right] \qquad (7)$$

Substituting this value of mutual inductance given by Equation 7 into the voltage-current relationship of Equation 1 and collecting only the resulting real terms results in the following expression:

$$V_r = \frac{\omega\nu A_t A_r I}{2\pi L^3}\left[\left(\frac{L}{\delta}\right)^2 - \frac{2}{3}\left(\frac{L}{\delta}\right)^3 + \frac{2}{15}\left(\frac{L}{\delta}\right)^5 - \cdots\right] \qquad (8)$$

where "$V_r$" denotes the sum of all voltage components which are induced in the receiver coil R which are in phase with the transmitter coil current "$I$."

In a similar manner, the resulting imaginary terms define a voltage component "$V_x$" which represents the sum of all the voltage components induced in the receiver coil R which are in phase quadrature with the transmitter coil current "$I$." In other words:

$$V_x = -j\frac{\omega\nu A_t A_r I}{2\pi L^3}\left[1 - \frac{2}{3}\left(\frac{L}{\delta}\right)^3 + \frac{1}{2}\left(\frac{L}{\delta}\right)^4 - \frac{2}{15}\left(\frac{L}{\delta}\right)^5 + \cdots\right] \qquad (9)$$

The voltage component resulting when the first term within the square brackets of Equation 9, namely, the unity factor, is multiplied by the common multiplier is the voltage component resulting from direct flux coupling between the transmitter and receiver coils. The remaining terms of Equation 9, on the other hand, denote inductive components resulting from secondary current flow in the surrounding formation material. This should be compared with Equation 8 for the resistive $V_r$ signal where all the component terms result from current flow in the surrounding material.

The expression for the resistive or in-phase voltage $V_r$ given by Equation 8 may be further simplified by factoring out the common $$\left(\frac{L}{\delta}\right)^2$$

term and evaluating the factored $\delta$ by means of Equation 5. In this manner:

$$V_r = \sigma\left(\frac{\omega^2\nu^2 A_t A_r I}{4\pi L}\right)\left[1 - \frac{2}{3}\frac{L}{\delta} + \frac{2}{15}\left(\frac{L}{\delta}\right)^3 - \cdots\right] \qquad (10)$$

The terms within the parenthesis represent constant factors and, hence, may be replaced by a constant "$K$" such that:

$$K = \left(\frac{\omega^2\nu^2 A_t A_r I}{4\pi L}\right) \qquad (11)$$

This assumes, of course, that both the magnitude $I$ and the frequency $\omega$ of the transmitter coil current are held constant.

In view of the fact that the quadrature-phase $V_x$ terms are effectively eliminated by the phase selective circuits 15, these terms will not be given any further consideration. Turning then to the in-phase voltage signal $V_r$, this signal may be considered as being comprised of two components such that:

$$V_r = V_g - V_s \qquad (12)$$

The $V_g$ term denotes the so called "geometrical factor" signal predicted by the linear theory set forth in the previously mentioned technical paper by Doll. In other words:

$$V_g = K\sigma \qquad (13)$$

This geometrical factor signal corresponds to the first term of Equation 10. The remaining terms of Equation 10 denote nonlinear components and are represented by the $V_s$ term of Equation 12. Thus:

$$V_s = K\sigma\left[\frac{2}{3}\frac{L}{\delta} - \frac{2}{15}\left(\frac{L}{\delta}\right)^3 + \cdots\right] \qquad (14)$$

In other words, $V_s$ denotes the nonlinear or skin effect portion of the in-phase signal $V_r$.

The manner in which the total in-phase signal $V_r$ and the geometrical factor component $V_g$ thereof vary as a function of formation conductivity, all other factors being constant, are indicated by the correspondingly designed curves of the graph of FIG. 2. As seen in FIG. 2, the geometrical factor component $V_g$ varies in a linear manner with conductivity, while the total in-phase signal $V_r$ increases but at a rate which decreases in a nonlinear manner as the conductivity increases. The difference in output volts indicated by $V_g$ and $V_r$ for a given conductivity value denotes the signal loss occasioned by the occurrence of the skin effect phenomena. For low values of formation conductivity the difference is appreciable. In particular, if the recorder 16 is calibrated in a linear manner with respect to conductivity, then for the higher conductivity values the conductivity indicated by recorder 16 will be too low.

The purpose of the present invention is to correct for or compensate for the skin effect errors introduced by the nonlinear components of $V_r$. To this end, the fractional signal loss or fractional signal reduction caused by the skin effect nonlinearity is defined as:

$$\lambda = \frac{V_s}{V_g} \qquad (15)$$

where "$\lambda$" denotes the fractional signal loss.

Evaluating Equation 15 in terms of the relationships of Equations 13 and 14, where only the first term of Equation 14 is utilized, shows that to a very good approximation the fractional signal loss or skin effect error is:

$$\lambda \cong \frac{2}{3}\frac{L}{\delta} \qquad (16)$$

The effect of neglecting the higher order terms of Equation 14 is negligible except for the extreme case of very high formation conductivity and a large coil spacing.

Evaluating the skin depth factor $\delta$ by means of Equation 5 and collecting the constant terms leads to the expression:

$$\lambda \cong (3.37 \times 10^{-5}) L \sqrt{f\sigma} \quad (17)$$

where "$f$" denotes the frequency of the alternating current supplied to the transmitter coil T, that is, the operating frequency, and the coil spacing factor L is expressed in inches. Equation 17 shows that the fractional skin effect error is directly proportional to the coil spacing L. It also shows that the fractional error is proportional to the square root of both the operating frequency $f$ of the coil system and the conductivity $\sigma$ of the surrounding medium. Thus, Equation 17 describes in a quantitative manner the relationship of the significant parameters $f$, $\sigma$, and L to the magnitude of the skin effect error $\lambda$.

Realizing that the spacing factor L is constant for any given coil construction, Equation 17 may be rewritten as:

$$\lambda \cong k\sqrt{f\sigma} \quad (18)$$

where "$k$" denotes the new proportionality constant. Equation 18 represents the basic relationships utilized in carrying out the principles of the present invention.

Referring now to FIG. 3 of the drawings, there is shown in a schematic manner a representative embodiment of induction logging apparatus constructed in accordance with the principles of the present invention. The apparatus of FIG. 3 includes a coil system 18 adapted for movement through the borehole 11 for investigating the earth formations 12 adjacent thereto. The coil system 18 shown in FIG. 3 is more complex than the simple two-coil system shown in FIG. 1 and includes a pair of transmitter coils $T_1$ and $T_2$ connected in a series opposing manner. The coil system 18 further includes three receiver coils $R_1$, $R_2$, and $R_3$, the latter two being connected in a series opposing manner with respect to $R_1$. As before, the coils are of the cylindrical solenoid type having their center axes in line with one another and generally in line with the longitudinal axis of the borehole 11.

This complex type of coil system is constructed in accordance with the teachings of U.S. Patent No. 2,582,314, granted to H. G. Doll on January 15, 1952. As indicated in this patent, the use of the additional coils serves to provide highly desirable focusing action. In particular, the outer two auxiliary coils $T_2$ and $R_2$ serve primarily to offset or cancel voltage components induced in the primary receiver coil $R_1$ by secondary or eddy currents flowing in regions beyond the ends of the coil system. In other words, $T_2$ and $R_2$ primarily provide a desired vertical focusing action which increases the system accuracy when relatively thin earth strata are being investigated. The other auxiliary coil, $R_3$, serves two useful functions. First, it serves to cancel voltage components induced in the receiver coil $R_1$ by secondary currents circulating primarily in the drilling mud 13 contained in the borehole 11. This renders the net response more accurately representative of only the conductivity of the adjacent earth material. Receiver coil $R_3$ further serves to cancel or offset the quadrature voltage component induced in the receiver coil $R_1$ by direct flux coupling between such receiver coil and the transmitter coils. Consequently, a large portion of the unwanted quadrature component is effectively balanced out by the auxiliary receiver coil $R_3$. In order to achieve these desired results for the auxiliary coils, the number of turns on the individual coils and the spacings of the various coils relative to one another are selected in accordance with the teachings of this Doll Patent No. 2,582,314. Note that the schematic representation of FIG. 3 is not intended to give any indication of the actual coil sizes, spacings, and numbers of turns.

The electrical circuits for operating coil system 18 are contained within a fluid tight housing 19 which is mechanically attached to the coil system 18 and adapted for movement through the borehole 11 therewith. Electrical power for operating the downhole electrical circuits is supplied to such circuits by a power supply 20 located at the surface of the earth. A cooperating power supply $20a$ located within the fluid-tight housing 19 receives this power from the surface power supply 20 and distributes it in the requisite form to the various electrical circuits of the downhole apparatus. For sake of simplicity, the various interconnections between the downhole power supply $20a$ and the other electrical circuits have been omitted. Output signals from the downhole apparatus are recorded at the surface of the earth by a recorder 21 which, for example, may be of the multiunit recording galvanometer type. Suitable means (not shown) are provided for raising and lowering the downhole apparatus in the borehole 11 and also for advancing the recording medium of the recorder 21 in synchronism with such movement.

The fractional skin effect error for the case of a complex coil array of the type shown in FIG. 3 may be evaluated in a manner similar to that used for the simple two-coil array to FIG. 1. To this end, each possible transmitter-receiver coil pair of the FIG. 3 system is considered as being a simple two-coil system. Consequently, the fractional skin effect error for the complex array of FIG. 3 is described by the following expression:

$$\lambda = \frac{\pm V_{s1} \pm V_{s2} \pm V_{s3} \pm \cdots}{\pm V_{g1} \pm V_{g2} \pm V_{g3} \pm \cdots} \quad (19)$$

where:

$V_{s1}$=skin effect voltage component for $T_1$ and $R_1$.
$V_{g1}$=geometrical factor voltage component for $T_1$ and $R_1$.
$V_{s2}$=skin effect voltage component for $T_1$ and $R_2$.
$V_{g2}$=geometrical factor voltage component for $T_1$ and $R_2$.
Etc. (noting that there are six different two-coil systems contained in this five-coil array).

The sign of the individual terms of Equation 19 is plus if the pair of transmitter and receiver coils producing the term are of like polarity and minus if the two coils producing the term are of opposite polarity. Equation 19 corresponds to Equation 15 given for the two-coil case of FIG. 1.

Evaluating Equation 19 in the same manner as was done for Equation 15 in deriving Equation 16 yields the following expression for the fractional skin effect error $\lambda$:

$$\lambda \cong \frac{2}{3} \frac{1}{\delta} \frac{\Sigma(A_t A_r)}{\Sigma\left(\frac{A_t A_r}{L}\right)} \quad (20)$$

where $$\Sigma(A_t A_r) = \pm A_{t1} A_{r1} \pm A_{t1} A_{r2} \pm \cdots$$

and $$\Sigma\left(\frac{A_t A_r}{L}\right) = \pm \frac{A_{t1} A_{r1}}{L_{11}} \pm \frac{A_{t1} A_{r2}}{L_{12}} \pm \cdots$$

where $L_{11}$=center-to-center spacing for $T_1$ and $R_1$.
$L_{12}$=center-to-center spacing for $T_1$ and $R_2$.

As for Equation 16, Equation 20 considers only the first order skin effect term for each coil pair.

The ratio of the summation factors of Equation (20) may be denoted as:

$$L' = \frac{\Sigma(A_t A_r)}{\Sigma\left(\frac{A_t A_r}{L}\right)} \quad (21)$$

In other words, $L'$ denotes the effective length of the coil system, as opposed to its actual physical length. $L'$ represents the weighted harmonic average of the individual coil spacings for the various transmitter-receiver coil pairs. It is a fixed constant for any given coil system construction.

The fractional skin effect error for the complex coil system of FIG. 3 can thus be expressed as:

$$\lambda \cong \frac{2}{3} \frac{L'}{\delta} \qquad (22)$$

This should be compared with Equation 16 for the simple two-coil system. It is seen that both expressions are the same except that in the complex system the effective length L' is used in place of the actual length L.

Again evaluating the skin depth factor $\delta$ by means of Equation 5, collecting the constant factors and representing them by the symbol $k'$ gives:

$$\lambda \cong k'\sqrt{f\sigma} \qquad (23)$$

Equation 23 thus shows that for the complex multi-coil system of FIG. 3, the fractional skin effect error is likewise proportional to the square root of both the operating frequency $f$ and the surrounding formation conductivity $\sigma$.

For the complex coil system of FIG. 3, the present invention makes use of the relationship of Equation 23 to compensate for the skin effect error $\lambda$. In particular, it can be seen from Equation 23 that if the operating frequency $f$ can be made to vary in inverse proportion with respect to variations in the formation conductivity $\sigma$ so as to hold the frequency-conductivity product constant, then the fractional skin effect error $\lambda$ is also held constant and will not vary as the formation conductivity varies. In other words, the fractional signal loss due to skin effect will always be the same. Consequently, the output signal recorded by recorder 21 will vary in a linear manner with respect to the formation resistance value, the constant error representing a fixed reduction in the sensitivity of the recorder 21. In other words, reduction of the output signal by a constant fraction corresponds to inserting a fixed amount of signal attenuation in the signal path. Consequently, this type of signal loss can be readily offset by increasing the signal gain factor in the output signal channel by a corresponding fixed amount. Alternatively, this constant signal loss can be taken into account in setting the recorder sensitivity factor.

Another approach is to make the constant value of the frequency-conductivity product small enough so that the resulting signal loss is relatively negligible. If the constant skin effect error is small enough, then no further special effort need be made to make up for the slight signal loss resulting therefrom.

To achieve the desired condition of constant fractional skin effect error, there are provided suitable electrical circuits for operating the coil system 18 of FIG. 3 so as to maintain the frequency-conductivity product substantially constant. To this end, the representative embodiment of FIG. 3 includes means for energizing the transmitter coils $T_1$ and $T_2$ with alternating current thereby to induce in the receiver coils $R_1$, $R_2$, and $R_3$ a signal component $V_r$ which is dependent on the electrical conductivity $\sigma$ of the adjacent formation material. In the present embodiment, this means includes a variable frequency oscillator 22 adapted to be controlled by a unidirectional signal "$V_e$" and coupled to the transmitter coils $T_1$ and $T_2$ for energizing such coils with alternating current having a constant amplitude "I" and a variable frequency "$f$." Variable frequency oscillators of the type adapted to be controlled by a unidirectional signal are known in the electronics art. A particularly suitable type of oscillator is the so-called "beat-frequency" oscillator. An oscillator of this type includes a pair of oscillator circuits, one being a fixed frequency oscillator circuit and the other being a variable frequency oscillator circuit. The output signals from these two oscillator circuits are beat together to produce a single output signal having a frequency equal to the difference of the two oscillator circuit frequencies. A reactance tube circuit or other suitable means is utilized to control the frequency of the variable oscillator circuit in accordance with a unidirectional control signal.

The apparatus of FIG. 3 also includes means coupled to the coil system for providing indications of the coil system response to variations in the electrical conductivity of the adjacent formations. In the present embodiment, this means includes an amplifier 23 coupled to the series-connected receiver coils $R_1$, $R_2$, and $R_3$ for providing at the output of such amplifier an amplified indication of the net $V_r$ component induced in the receiver coils. This amplified $V_r$ indication is an alternating-current voltage having a frequency corresponding to the operating frequency of the oscillator 22. The amplifier 23 is constructed to have a relatively wide frequency bandwidth in order to accommodate the necessary range of frequency variations.

The indication-providing means of the present embodiment further includes a phase sensitive detector 24 coupled to the output of the amplifier 23. There is also supplied to the phase sensitive detector 24 a phase reference signal which is developed across a resistor 25 which is connected in series with the transmitter coils. This phase reference signal is of the same phase as the transmitter coil current I. Under the control of this phase reference signal, the phase sensitive detector 24 serves to detect the in-phase or resistive voltage components $V_r$ appearing at the output of amplifier 23, while rejecting any residual quadrature phase components that may be present. Consequently, the signal indication $V'_r$ appearing at the output of the phase sensitive detector 24 is in the form of a unidirectional or direct-current type of signal having an amplitude which is proportional to the net in-phase component $V_r$. In other words, with respect to the in-phase components, the phase sensitive detector 24 behaves like an ordinary amplitude detector.

The indication-providing means of the present embodiment further includes the recorder 21 located at the surface of the earth and coupled to the output of the phase sensitive detector 24.

The FIG. 3 apparatus further includes means for varying the frequency of the energizing current I inversely to the conductivity variations of the adjacent formation material. In the present embodiment, this frequency-varying means is responsive to the magnitude of the in-phase signal component $V_r$ developed across the receiver coils $R_1$—$R_3$ for deriving a unidirectional control signal $V_e$ for controlling the frequency of the variable frequency oscillator 22 for maintaining the frequency-conductivity product substantially constant. In the present embodiment, this frequency-varying means includes frequency detector circuit means coupled to the variable frequency oscillator 22 for providing a reference signal representative of the frequency of oscillation thereof. This frequency detector circuit includes an inductor 26 connected in series in the transmitter coil current path and an amplitude-type detector circuit 27 having its input terminals connected across such inductor 26. The inductor 26 is of the high "Q" type having a minimum of self resistance. The magnitude of the voltage drop $V_f$ across this inductor 26 will vary as the frequency of the transmitter current varies so that there is developed at the output of the detector circuit 27 a unidirectional or direct-current type of signal $V'_f$ having an amplitude which is proportional to the frequency of the transmitter current I.

The frequency-varying means of the present embodiment further includes a difference circuit 28 jointly responsive to both the in-phase receiver coil signal component $V_r$ and the frequency-representative reference signal $V_f$, as represented by their unidirectional replicas $V'_r$ and $V'_f$ for deriving a unidirectional control signal $V_e$ for varying the frequency of oscillator 22 inversely with respect to the value of the formation conductivity. This difference circuit 28 may take the form of any of the various known types of circuits for subtracting a pair of unidirectional signals. The resulting difference signal $V_e$ appearing at the output of the difference circuit 28 is used as a feedback error signal and is supplied to the frequency control element of the variable frequency oscillator 22 to control the operating frequency thereof.

Considering now the operation of the FIG. 3 apparatus, as the downhole portion of the apparatus including coil system 18 and the fluid-tight instrument housing 19 are moved through the borehole 11, the variable frequency oscillator 22 is operative to supply alternating current of constant magnitude I and variable frequency $f$ to the series-connected transmitter coils $T_1$ and $T_2$. The resulting alternating flux field surrounding the transmitter coils $T_1$ and $T_2$ induces secondary current flow in the earth formation material 12 adjacent the coil system 18. The magnitude of this secondary current flow is dependent on the electrical conductivity of the adjacent formation material. This flow of secondary current, in turn, serves to induce both in-phase and quadrature-phase voltage components in the receiver coils, as indicated by Equations 10 and 9. The net voltage components resulting from the series-opposing connections of the receiver coils are then supplied by way of amplifier 23 to the phase sensitive detector 24. The phase sensitive detector 24, under the control of the phase reference signal developed across the resistor 25, serves to pass only the net in-phase component $V_r$, the net quadrature-phase component being effectively blocked or rejected.

A further quadrature-phase voltage component resulting from direct flux coupling between transmitter and receiver coils is largely canceled by the series-opposing connection of the coils. Any residual quadrature component resulting from this direct flux coupling is blocked or rejected by the phase sensitive detector 24. Consequently, the only voltage component appearing across the receiver coils which has any appreciable effect on the operation of the remainder of the apparatus is the in-phase voltage component $V_r$.

From Equation 10, it is seen that this in-phase component $V_r$ is described by the relationship:

$$V_r \cong k_1 f^2 \sigma \tag{24}$$

where all the constant terms are represented by the proportionality constant "$k_1$" and only the first term of Equation 10 is used. The remaining terms of Equation 10 are neglected in order to simplify the description. It can be shown, however, that the same results will occur where all the terms of Equation 10 are considered. The unidirectional indication $V'_r$ appearing at the output of the phase sensitive detector 24 is thus described by the expression:

$$V'_r = k'_1 f^2 \sigma \tag{25}$$

where the new proportionality constant $k'_1$ also includes the conversion constant for the phase sensitive detector 24. This unidirectional signal $V'_r$ is supplied to one pair of input terminals of the difference circuit 28.

At the same time, there is supplied to a second pair of input terminals of the difference circuit 28 a unidirectional reference signal $V'_f$ having an amplitude which is proportional to the instantaneous operating frequency of the oscillator 22. To this end, the flow of transmitter coil current I through the series inductor 26 develops across such inductor 26 a voltage drop $V_f$ which is described by the expression:

$$V_f = 2\pi L_0 I \tag{26}$$

where "$L_0$" denotes the inductance of inductor 26. The only variable in Equation 26 is the frequency factor "$f$." Consequently, Equation 26 may be rewritten as:

$$V_f = k_2 f \tag{27}$$

In other words, the amplitude of the voltage $V_f$ is proportional to the operating frequency $f$. This amplitude is then detected by the detector circuit 27 to provide a unidirectional output signal $V'_f$ which is described by the relation:

$$V'_f = k'_2 f \tag{28}$$

where the new proportionality constant $k'_2$ includes the conversion constant of the detector 27.

Difference circuit 28 is effective to subtract the two unidirectional input signals $V'_f$ and $V'_r$ to produce an output difference signal $V_e$ such that:

$$V_e = V'_f - V'_r \tag{29}$$

This difference signal $V_e$, which is likewise a unidirectional signal, is then utilized as a feedback error signal for controlling the operating frequency of oscillator 22. In particular, this error signal $V_e$ is supplied to the voltage control input terminals of the oscillator 22 so as to adjust the oscillator frequency in the proper direction to reduce the error signal to zero. Thus, the oscillator 22, the coil system 18, the amplifier 23, and the phase sensitive detector 24 form a degenerative feedback loop for maintaining the conductivity-representative signal $V'_r$ equal in magnitude to the frequency-representative signal $V'_f$, which condition is fulfilled when the error signal $V_e$ is equal to zero. Sufficient signal gain is included in this feedback loop to substantially accomplish this purpose.

From Equations 29, 28, and 25, it is seen that the feedback error signal $V_e$ is described by the relationship;

$$V_e = k'_2 f - k'_1 f^2 \sigma \tag{30}$$

Because of the degenerative feedback action, $V_e$ is substantially zero and, consequently:

$$k'_2 f = k'_1 f^2 \sigma \tag{31}$$

Rewriting Equation 31 and replacing the collected proportionality constants by a new proportionality constant "$a$" gives:

$$f\sigma = a \tag{32}$$

Equation 32 indicates that the degenerative feedback action operates to maintain the frequency-conductivity product substantially constant. This, then, provides the desired condition for maintaining the fractional skin effect error substantially constant as previously discussed.

Equation 32 can be rewritten in either of the following alternative forms:

$$f = \frac{a}{\sigma}$$

$$f = a\rho \tag{33}$$

where "$\rho$" denotes the "resistivity" of the surrounding formation material. It is seen from the first form that the operating frequency of the apparatus is varied in inverse proportion to the conductivity of the surrounding formation material. In terms of resistivity, however, the operating frequency varies in direct proportion thereto, as shown by the second expression.

In the apparatus of the present embodiment, the output signal $V_m$ supplied by the downhole apparatus to the recorder 21 located at the surface of the earth corresponds to the unidirectional signal $V'_r$ appearing at the output of the phase sensitive detector 24. Consequently:

$$V_m = V'_r = k'_1 f^2 \sigma \tag{34}$$

Substituting the value of the frequency $f$ given by either expression of Equation 33 into Equation 34 and replacing the collected proportionality constants by a new proportionality constant "$b$" gives:

$$V_m = \frac{b}{\sigma} = b\rho \tag{35}$$

It is thus seen that the output signal $V_m$ supplied to recorder 21 is directly proportional to the formation resistivity. This is in contrast to the previously known induction logging systems wherein the output signal supplied to the surface of the earth is normally proportional to conductivity and not resistivity. This represents a secondary benefit of the present invention in that no reciprocator circuit is required for producing a reciprocated curve for comparison with the resistivity curves recorded by other types of electrical logging devices.

In addition to overcoming the adverse influence of the skin effect phenomena, the present invention also provides higher operating frequencies when the apparatus is investigating formation regions having lower conductivity values. As indicated by Equation 34, this provides higher signal levels for both the $V_r$ and $V_m$ signals under these adverse formation conditions. This improves the signal-to-noise ratio and, consequently, the accuracy operation of the apparatus. Also, in a more general sense, the present invention enables the use of substantially higher frequencies over a greater portion of the range without introducing excessive skin effect errors. For the five-coil system of FIG. 3, for example, the apparatus may be constructed to provide an operating frequency of 40 kilocycles per second when the coil system is opposite an earth formation region having a conductivity of 100 millimhos per meter. For one form of five-coil construction, this produces a constant skin effect error of 3.4% so long as the frequency-conductivity product is maintained constant at the 40×100 value. For the same frequency-conductivity value, a corresponding two-coil system would have a constant skin effect error of approximately 8%.

In practice, formation, conductivities of zero and infinity, corresponding to infinite and zero formation resistance, are practically non-existent. Because of the saline solutions, that is, the connate formation waters, contained in the formation pore spaces or absorbed in the formation material, the formation conductivities have finite values somewhere intermediate the theoretical zero and infinity values. Consequently, for a majority of the conductivity ranges encountered in practical cases, the requisite frequency range may be covered by a single variable frequency oscillator. If, however, it is desired to extend the operating range of the apparatus to cover the more extreme values at the ends of the range, then this may be done with a minimum of difficulty by using a two-mode type of operation wherein the variable frequency type of operation just described is provided for the higher conductivity values while the operating frequency is held constant to provide a constant frequency mode of operation for the lower conductivity values. In this manner, the skin effect phenomena will be compensated for over the conductivity range where it is most troublesome, while no compensation will be provided for the lower conductivity range over which the skin effect error is relatively insignificant.

For the FIG. 3 apparatus, the transition point between operating modes is, for example, chosen to correspond to a formation conductivity value of 100 millimhos. The variable frequency oscillator 22 is then constructed so that its upper frequency limit is 40 kilocycles. The remainder of the apparatus is constructed so that this upper frequency limit is reached when the formation conductivity becomes 100 millimhos. Consequently, whenever the formation conductivity value falls below 100 millimhos, the oscillator frequency will remain at its upper limit of 40 kilocycles. On the other hand, when the formation conductivity becomes greater than 100 millimhos, the degenerative feedback loop will act to decrease the oscillator frequency to values lower than the 40 kilocycle upper limit. The apparatus will than operate automatically to maintain the frequency-conductivity product and, hence, the skin effect error substantially constant.

The recording apparatus located at the surface of the earth will require some modification in order to handle this two-mode type of operation. In particular, as seen by Equation 34, if the frequency $f$ is held constant, then the output signal $V_m$ supplied to the surface equipment will become:

$$V_m = c\sigma \quad (36)$$

where "$c$" denotes the new proportionality constant. In other words, during the constant frequency mode the output signal $V_m$ will be directly proportional to conductivity whereas during the variable frequency mode the output signal will be directly proportional to resistivity.

Referring to FIG. 4 of the drawings, there is shown a modified embodiment of the surface recording apparatus for use with this two-mode type of operation to provide a single recorded curve for the entire range which is in terms of a single formation parameter. This parameter may be either "resistivity" or "conductivity." For the present embodiment, resistivity is used. To this end, the apparatus of FIG. 4 includes signal recorder means represented by the recorder 21 and signal reciprocator means represented by a reciprocator 30. Reciprocator 30 serves to provide an output signal which is proportional to the reciprocal of the input signal supplied thereto. Various types of circuits, servo systems, and devices are known in the electronics art for producing this type of signal reciprocating action. The apparatus of FIG. 4 further includes circuit means 31 for coupling the downhole output signal $V_m$ directly to the recorder 21 when the conductivity value causes operation in the variable frequency mode and for coupling the downhole output signal to the recorder 21 by way of the reciprocater 30 when the conductivity value causes operation in the constant frequency mode. Thus, circuit means 31 constitutes a switching circuit for switching the signal path to the recorder 21 when the operating mode of the downhole apparatus changes.

For the present embodiment, the switching circuit 31 includes a first signal channel including a resistor 32 for supplying the downhole signal $V_m$ directly to the recorder 21. The signal translating condition of this signal channel is controlled by a diode switching circuit 33 which is connected to the output side of the resistor 32. The switching circuit 31 also includes a second signal channel including a resistor 34 for supplying the output signal from reciprocator 30 to the recorder 21. This second signal channel is controlled by a second diode switch 35 which is connected to the output side of the resistor 34.

The switching circuit 31 further requires an alternating current control signal, designated "$V_{ac}$," having a frequency corresponding to the instantaneous operating frequency of the downhole apparatus. Such a control signal is obtained from the FIG. 3 apparatus by additionally supplying the voltage signal developed across the resistor 25 to the surface equipment by way of a second pair of cable conductors. At the surface, this control signal "$V_{ac}$" is supplied to a high pass filter 36 included within the switching 31 as shown in FIG. 4. Filter 36 is of the sharp cutoff type and is constructed to have a cutoff frequency corresponding to the mode transistion frequency of 40 kilocycles for the downhole apparatus. The output of filter 36 is coupled by way of an amplifier 37 to a detector 38. As a result, if the downhole operating frequency is equal to or greater than the 40 kilocycle value, then a substantial direct-current voltage of positive polarity appears at the output of the detector 38. If, on the other hand, the downhole operating frequency is less than 40 kilocycles, then the voltage level at the output of detector 38 is very nearly zero.

Assuming first, that the downhole apparatus is operating in the variable frequency mode, then the operating frequency will be less than 40 kilocycles and the output of detector 38 will be very nearly zero. Considering first the upper signal channel, this condition of zero output from detector 38 causes a control tube 40 associated with the diode switch 33 to remain in a non-conductive condition. This, in turn, causes a relatively heavy flow of current through a coupling diode 41 and a bias resistor 42 coupled to the anode of tube 40. The resulting voltage drop across resistor 42 maintains a switching diode 43 in a nonconductive condition. Consequently, switching diode 43 has no effect on the upper signal channel, thus allowing the $V_m$ signal to be supplied directly to the recorder 21.

Considering the lower signal channel, on the other hand, the occurrence of zero output from the detector 38 enables a control tube 44 associated with the diode switch 35 to likewise remain in a nonconductive condition. In this case, however, the cathode of this control tube 44 is connected in series with a coupling diode 45 and a bias resistor 46. Consequently, with tube 44 nonconductive, a strong reverse bias is placed across diode 45 rendering the same nonconductive. Consequently, no current flows through the coupling diode 45 and no bias voltage is produced across the resistor 46. As a result, a switching diode 47 is rendered conductive by the positive polarity output signal from reciprocator 30 appearing at the anode thereof. The value of resistor 46 is small relative to the value of resistor 34 so that with the switching diode 47 conductive, the output side of resistor 34 is effectively grounded. In other words, the low resistance shunt path through the switching diode 47 and the resistor 46 causes the reciprocator output signal attempting to pass by way of the lower signal channel to dissipate itself as a voltage drop across the resistor 34. Consequently, substantially no reciprocated signal is supplied to the recorder 21. The only signal supplied to the recorder 21 is the one supplied by way of the upper signal channel. Since this signal is directly proportional to formation resistivity at this time, a resistivity curve is recorded by recorder 21.

When the downhole apparatus passes into the constant frequency mode of operation, then the signal translating conditions of the upper and lower signal channels are reversed. In particular, in the constant frequency mode the operating frequency is equal to 40 kilocycles and a relatively large positive voltage appears at the output of detector 38. This renders both the upper and lower control tubes 40 and 44 conductive. This causes a negative voltage to be applied to the anode of the upper coupling diode 41 and a positive voltage to be applied to the anode of the lower coupling diode 45. Consequently, the upper switching diode 43 is rendered conductive by the positive polarity $V_m$ signal, while the lower switching diode 47 is rendered nonconductive by the reverse bias voltage developed across resistor 46. As for the lower signal channel, resistor 42 of the upper channel is of a low value relative to the value of resistor 32 in series with the signal path. Consequently, the shunting action of switching diode 43 and resistor 42 effectively disables the upper signal channel so that no signal is supplied thereby to the recorder 21. The lower switching diode 47, however, is now nonconductive so that the reciprocator output signal may pass freely by way of the lower signal channel to the recorder 21. During this constant frequency operating mode, the $V_m$ signal is directly proportional to formation conductivity. The reciprocator 30 is then effective to take the reciprocal of this signal so that the signal appearing at the output thereof is again in terms of formation resistivity. This resistivity signal from reciprocator 30 is then supplied to the recorder 21 so that a continuous resistivity curve is recorded for the entire range of formation values.

Another manner of operating the FIG. 3 apparatus which will be useful in some cases is to operate the apparatus so that the product $f^2\sigma$ is held constant, instead of the product $f\sigma$. This type of operation is achieved with the FIG. 3 apparatus by removing the detector circuit 27 and instead applying a unidirectional reference signal of fixed magnitude to the $V'_f$ input terminals of the difference circuit 28. In this case, the fractional skin effect error is proportional to the fourth root of the formation conductivity. In other words, thes skin effect variation will not be completely eliminated but it will be considerably minimized. An advantage of this mode of operation is that the required range of frequency variation is reduced by a square root factor. In other words, a ten-fold change in frequency will cover the same conductivity range as would otherwise be covered by a hundred-fold change in frequency. With this type of operation, the output signal is proportional to the square root of the formation resistivity. Accordingly, a compressed scale type of indication would be provided by the recorder 21 located at the surface of the earth. In some cases, this type of scale presentation is more advantageous than the purely linear type of scale presentation.

Referring now to FIG. 5 of the drawings, there is shown a further embodiment of the present invention for overcoming the undesired effects of the electrical skin effect phenomena. Portions of the FIG. 5 apparatus are the same as portions of the FIG. 3 apparatus and, accordingly, are designated by the same reference numerals. The FIG. 5 apparatus is a two-mode type of apparatus having both variable frequency and constant frequency operating modes. In this case, however, a novel type of recorder scale presentation is provided with very little change required in the surface equipment. As before, the variable frequency oscillator 22 serves to energize the transmitter coils $T_1$ and $T_2$ to induce in the receiver coils $R_1$, $R_2$ and $R_3$ a net voltage component $V_r$ which is proportional to the formation conductivity. This receiver coil signal is supplied by way of amplifier 23 to phase sensitive detector 24 to provide the unidirectional $V'_r$ signal which is proportional thereto. This unidirectional signal $V'_r$ is supplied to a first pair of input terminals of the difference circuit 28. A frequency-representative reference signal $V_f$ is developed across the inductor 26 and detected by detector 27 to provide the corresponding unidirectional signal $V'_f$ which is supplied to the second pair of input terminals of the difference circuit 28. The resulting unidirectional difference signal $V_e$ is again supplied to the control terminals of variable frequency oscillator 22 to control the operating frequency thereof to reduce this difference signal very nearly to zero. These circuit elements are thus effective to provide the variable frequency operating mode in the same manner as was done in the FIG. 3 apparatus.

In addition to the foregoing, the apparatus of FIG. 5 also includes circuit means operative over the low conductivity end of the conductivity range for disabling the unidirectional control signal developed by difference circuit 28 and for instead applying a fixed bias signal to the variable frequency oscillator 22 for maintaining the frequency of oscillation thereof substantially constant. This disabling circuit means includes a limiter or disabling circuit 50 and an amplifier 51 located in the error signal feedback path intermediate the difference circuit 28 and the control terminals of the oscillator 22. The limiter circuit 50 includes a voltage dropping resistor 52, a switching diode 53, and a source of diode bias voltage represented by a battery 54. Battery 54 maintains the switching diode 53 nonconductive until the error signal $V_e$ exceeds the voltage value of such battery. When this occurs, the diode 53 becomes conductive to provide a low impedance shunt path across the output of resistor 52. When this occurs, the error signal dissipates itself as a voltage drop across resistor 52. At the same time, the input voltage to the control terminals of the oscillator 22 is held constant at a value corresponding to the voltage value of battery 54.

Figure 6:
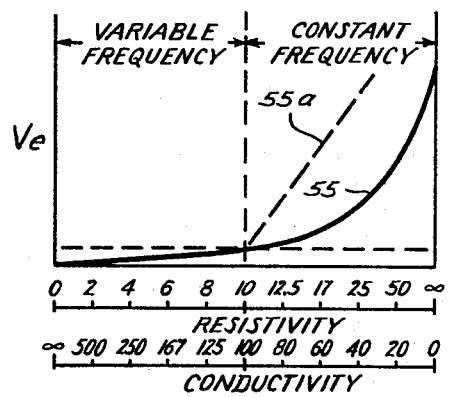
FIGS. 6 and 7 are graphs used in explaining the operation of the FIG. 5 apparatus.

The manner in which the switching action occurs may be better understood by considering the graphs of FIG. 6. Curve 55 of FIG. 6 depicts the manner in which the magnitude of the error signal $V_e$ varies as a function of formation conductivity, assuming for the moment that the feedback loop is operative to vary the frequency over the entire scale range. The horizontal axis of the FIG. 6 graph is plotted in terms of the novel type of scale presentation that will be provided on the recorder 21 by the present apparatus. In particular, the horizontal axis is calibrated from left to right in terms of formation resistivity. It is also calibrated from right to left in terms of formation conductivity. Note that resistivity is the reciprocal of conductivity. It is also noted that the left-hand half of the scale range is linear in terms of formation resistivity, while the right-hand half is linear in terms of formation conductivity. This hybrid type of scale presentation affords substantial advantages in interpreting the logs or records produced by the recorder 21.

As seen in FIG. 6, the $V_e$ error signal increases in magnitude as the formation conductivity decreases. Accordingly, a predetermined magnitude value of the $V_e$ error signal can be utilized to control the disabling circuit 50 so as to switch the operating mode of the downhole apparatus. In the present example, the 100 millimho conductivity value is again used as the transition point. Thus, when the formation conductivity is less than the 100 millimho value, the amplified error signal appearing at the output of amplifier 51 exceeds the bias voltage of battery 54. This renders the diode 53 conductive to apply a fixed bias signal to the control terminals of oscillator 22. This provides the constant frequency mode of operation. During this mode of operation, the error signal $V_e$ will actually vary in the manner indicated by dashline curve 55a of FIG. 6. When, on the other hand, the formation conductivity is greater than 100 millimhos, disabling circuit 50 has no effect on the feedback loop. Consequently, the variable frequency mode of operation is then provided.

In order to provide a suitable output signal for the recorder 21 at the surface of the earth, the downhole apparatus of FIG. 5 further includes circuit means responsive to both the unidirectional control signal $V_e$ and the reference signal $V'_f$ for providing an output signal $V_m$ which is linear in terms of resistivity over the variable frequency operating range and which is linear in terms of conductivity over the constant frequency range. In the present embodiment, this circuit means takes the form of a summing amplifier 56. The output signal $V_m$ appearing at the output of the summing amplifier 56 thus corresponds to:

$$V_m = V'_f + V_e \qquad (37)$$

Figure 7:
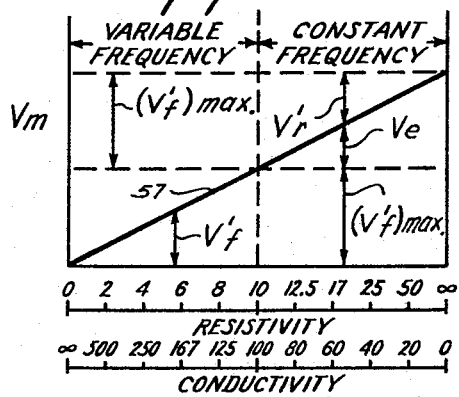

The manner in which this composite output signal $V_m$ serves to produce the desired results will be explained with the help of the graph of FIG. 7. In FIG. 7, curve 57 indicates the manner in which the output signal $V_m$ varies with formation conductivity. More particularly, both conductivity and resistivity calibrations are given for the horizontal axis of FIG. 7. At this point, it should be carefully noted that the recorder 21 located at the surface of the earth is a linear type of device having scale calibration marks 58 uniformly and evenly spaced with respect to one another. Also, the recorder deflection which produces a recorder trace 59 is directly and linearly proportional to the magnitude of the voltage signal $V_m$ supplied to the recorder 21. The particular numerical values associated with the calibration marks 58, however, progress in the same hybrid manner as shown for the graphs of FIGS. 6 and 7. In particular, the numerical values over the left-hand half of the scale range vary in a linear manner in terms of formation resistivity, while those over the right-hand half of the scale range vary in a linear manner in terms of formation conductivity.

Starting at the high conductivity end of the scale range, the downhole apparatus of FIG. 5 operates first in the variable frequency mode. In this mode, the difference signal or error signal $V_e$ is maintained at a very low value approximating zero. Consequently, the output signal $V_m$ given by Equation 37 becomes for all practical purposes:

$$V_m = V'_f = k'_2 f \qquad (38)$$

As previously indicated, for the case of variable frequency operation, the operating frequency $f$ becomes directly proportional to the formation resistivity value $\rho$. Consequently, Equation 38 may be rewritten as:

$$V_m d\rho \qquad (39)$$

where "$d$" represents the new proportionality constant. Thus, for the variable frequency half of the scale range, the magnitude of the output signal $V_m$ is directly proportional to the formation resistivity. As a result, the curve recorded by recorder 21 is linear in terms of resistivity over the left hand half of the scale range.

Assuming now that the formation conductivity decreases below the 100 millimho mode transition value, then the disabling circuit 50 is operative to disable the feedback loop and instead apply a fixed bias signal to the oscillator 22. This holds the oscillator frequency to a constant maximum value for the remainder of the scale range. In this case, both terms of Equation 37 must be considered. The second or $V_e$ term of Equation 37 is, however, equal to the difference between $V'_f$ and $V'_r$ and, thus, Equation 37 may be rewritten as:

$$V_m = V'_f + V'_f - V'_r \qquad (40)$$

The operating frequency $f$ is now being held to a constant maximum value so that Equation 40 may be rewritten as:

$$V_m = 2(V'_f)_{max} - V'_r \qquad (41)$$

where the subscript "max" indicates the fixed maximum value of $V'_f$. For this constant frequency operation the value of $V'_r$ given by Equation 25 becomes:

$$V'_r = k_3 \sigma \qquad (42)$$

where "$k_3$" represents the new proportionality constant. Thus, Equation 41 can be rewritten as:

$$V_m = 2(V'_f)_{max} - k_3 \sigma \qquad (43)$$

Equation 43 shows that the output signal $V_m$ now effectively contains two components. The first component, namely, $2(V'_f)_{max}$, is of fixed magnitude and serves to provide a full scale deflection of the trace on recorder 21. The second component, namely, the negative component $k_3 \sigma$, then serves to subtract from this full scale deflection voltage so as to drive the recorder trace deflection back towards the left and away from the right hand scale extremity in a linear manner with respect to conductivity. In other words, in this constant frequency operating mode, the output signal $V_m$ varies in a linear manner with respect to conductivity so as to provide a similar variation for the recorder deflection, this variation being measured with respect to the right hand or zero conductivity extremity of the recorder scale range.

It is seen, therefore, that the apparatus of FIG. 5 provides a highly useful type of recorder scale presentation. At the same time, the range of variation required of the downhole operating frequency is held to within reasonable limits. Also, no additional apparatus is required at the surface of the earth and only a relatively minor modification is required of the downhole apparatus in FIG. 3.

Figure 8:
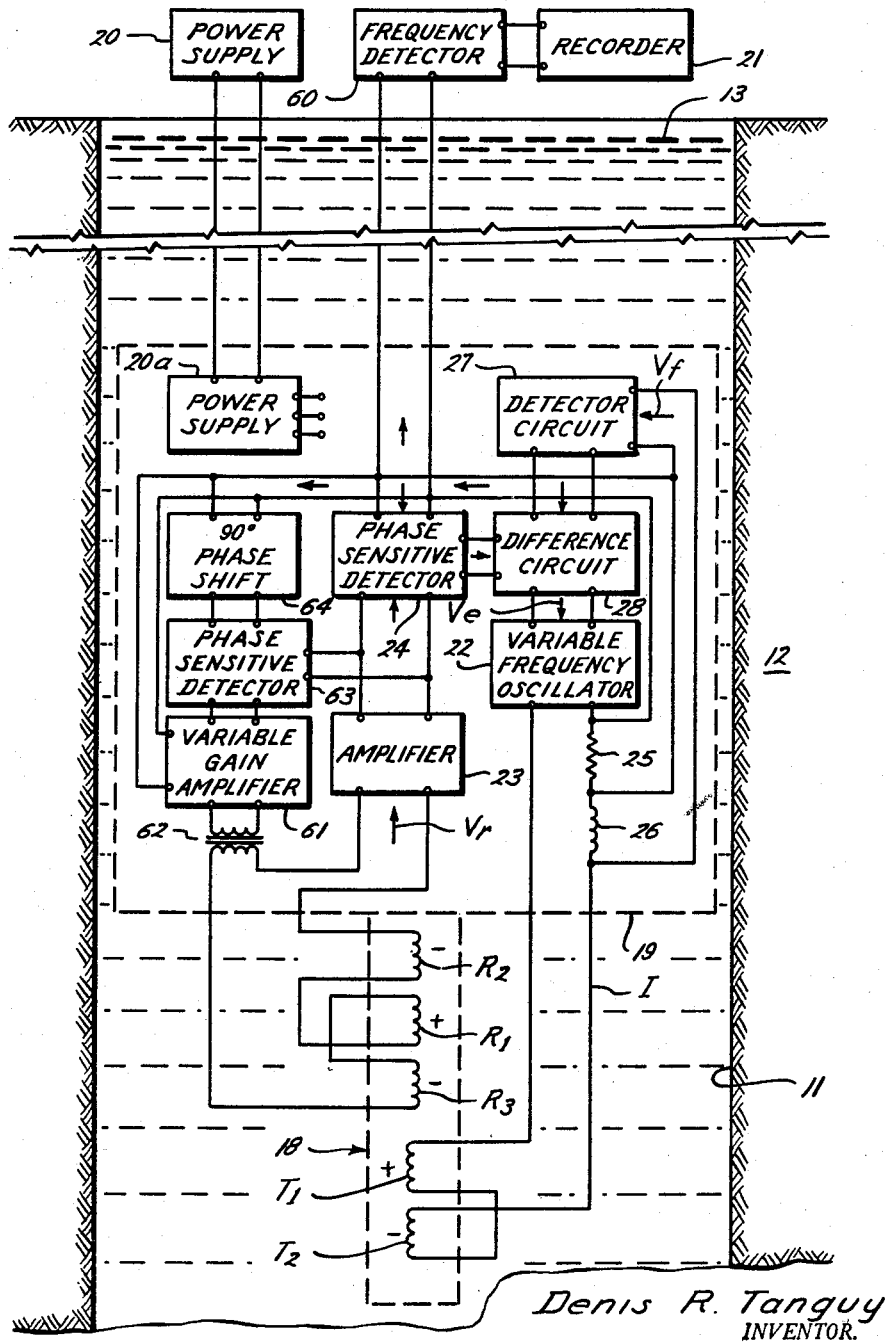
FIG. 8 shows a further form of induction logging system for practicing the principles of the present invention.

Referring now to FIG. 8 of the drawings, there is shown a further embodiment of induction logging apparatus constructed in accordance with the present invention. Portions of the FIG. 8 apparatus are the same as portions of the FIG. 3 apparatus and, consequently, are designated by the same reference numerals. The apparatus of FIG. 8 is constructed to provide variable frequency operation over the entire conductivity range of interest and, to this end, includes the same circuit elements as used in FIG. 3 to accomplish this purpose. A first feature of the FIG. 8, apparatus which differs from what is shown in FIG. 3 is the fact that the output signal from the downhole apparatus which is supplied to the surface of the earth is not the unidirectional signal appearing at the output of phase sensitive detector 24. Instead, the alternating-current signal developed across the resistor 25 is used as the output signal for the downhole apparatus. This alternating-current signal is of constant amplitude but has a frequency corresponding to the instantaneous operating frequency of the oscillator 22. Consequently, the frequency of the alternating-current signal supplied to the surface recording equipment is directly proportional to the resistivity of the surrounding formation material. In order to detect the frequency variations, there is located at the surface of the earth a frequency detector 60. Frequency detector 60 provides a unidirectional output signal which is proportional to the downhole operating frequency. This unidirectional signal is then supplied to the recorder 21 to provide a log or record of the downhole resistivity variations.

The apparatus of FIG. 8 further includes a so-called "variometer loop" for providing automatic cancellation of any residual quadrature-phase voltage components induced in the receiver coils $R_1$—$R_3$. This variometer loop includes a variable gain amplifier 61 having an output transformer 62, the secondary winding of which is coupled in series with the receiver coils $R_1$, $R_2$, and $R_3$. There is supplied to the input of this variable gain amplifier 61 a portion of the in-phase reference signal developed across resistor 25. This alternating-current reference signal is amplified by amplifier 61 and supplied to transformer 62 to induce a desired quadrature canceling component in the secondary winding thereof. The 90° phase shift provided by transformer 62 causes this secondary voltage component to be in phase quadrature with the transmitter coil current and, hence, of the same phase as the components which it is desired to cancel. The variable gain amplifier 61 is of the balanced type so that this secondary component may assume either a zero degree or 180° phase relationship along the quadrature axis. The magnitude and polarity of the quadrature component provided by transformer 62 is controlled by a phase sensitive detector 63. This detector 63 is coupled to the output of amplifier 23 for monitoring the output signal coming therefrom. The detector 63 is rendered sensitive to only the quadrature phase by means of a quadrature-phase reference signal supplied thereto by way of a 90° phase shift circuit 64, the input of which is connected to the resistor 25. Consequently, the unidirectional output signal developed by phase sensitive detector 63 is proportional to the magnitude of any quadrature-phase voltage appearing at the output of amplifier 23. This detector 63 output signal controls the variable gain amplifier 61 so as to adjust the magnitude and polarity of the quadrature voltage induced in the secondary winding of transformer 62 so as to reduce substantially to zero any quadrature voltage appearing at the output of amplifier 23. A degenerative feedback loop is thus provided for automatic cancellation of any remaining residual quadrature components. Where operating conditions require it, this automatic quadrature cancellation may be provided in any of the foregoing embodiments of this invention.

From the foregoing descriptions of the various embodiments of the invention, it is seen that, among other things, new and improved induction logging methods and apparatus are provided wherein the adverse effects of electrical skin effect are either eliminated altogether or else brought within reasonable limits. At the same time, the accuracy of the measurement has been improved and greater freedom in the choice of coil system construction has been made practical. While the present invention has been described in detail for the representative case of a five-coil system, it is to be clearly understood that the principles of the present invention may be practiced with coil systems having any desired number of coils.

While there have been described what are at present considered to be preferred embodiments of this invention, it will be obvious to those skilled in the art that various changes and modifications may be made therein without departing from the invention, and it is, therefor, intended to cover all such changes and modifications as fall within the true spirit and scope of the invention.

What is claimed is:

1. A method of investigating earth formations traversed by a borehole comprising: creating an alternating electromagnetic field in the adjacent earth formation material at a given depth in the borehole; obtaining an indication of the magnitude of this electromagnetic field; repeating the foregoing steps at different depths in the borehole; and varying the frequency of the electromagnetic field as a function of the indicated magnitude for providing indications which are more linearly related to an electrical property of the formation material.

2. A method of investigating earth formations traversed by a borehole comprising: creating an alternating electromagnetic field in the adjacent earth formation material at a given depth in the borehole; obtaining an indication of the magnitude of this electromagnetic field; repeating the foregoing steps at different depths in the borehole; and varying the frequency of the electromagnetic field in inverse proportion to any variation in the indicated magnitude thereby to provide indications which are more linearly related to an electrical property of the formation material.

3. A method of investigating earth formations traversed by a borehole comprising: inducing a flow of alternating current in the adjacent earth formation material at a given depth in the borehole; obtaining an indication of the magnitude of the electromagnetic field produced by this formation current flow; repeating the foregoing steps at different depths in the borehole; and varying the frequency of the formation current flow inversely to the magnitude indications thereby to provide more accurate indications of an electrical property of the formation material.

4. A method of investigating earth formations traversed by a borehole comprising: moving an alternating-current energized coil system through the borehole; obtaining indications of the coil system response to variations in the electrical conductivity of the formations; and varying the frequency of the coil system energizing current inversely to the magnitude of these indications thereby to provide indications which are less subject to skin effect variations.

5. In apparatus for investigating earth formations traversed by a borehole, the combination comprising; a coil system adapted for movement through the borehole; means for energizing the coil system with alternating current; means for providing indications of the coil system response to variations in the electrical conductivity of the formations; and means responsive to the magnitude of these indications for varying the frequency of the energizing current inversely to the conductivity variations thereby to provide indications which are less subject to skin effect variations.

6. In apparatus for investigating earth formations traversed by a borehole, the combination comprising: a coil system adapted for movement through the borehole and including at least one transmitter coil and at least one receiver coil; means for energizing the transmitter coil with alternating current thereby to induce in the receiver coil a signal component which is dependent on the electrical conductivity of the adjacent formation material; means responsive to the magnitude of this signal component for varying the frequency of the energizing current inversely with respect to the value of the formation conductivity; and means coupled to the coil system for providing indications representative of the formation resistivity.

7. In apparatus for investigating earth formations traversed by a borehole, the combination comprising: a coil system adapted for movement through the borehole and including at least one transmitter coil and at least one receiver coil; means for energizing the transmitter coil with alternating current thereby to induce in the receiver coil a signal component which is dependent on the electrical conductivity of the adjacent formation material; means responsive to the magnitude of this signal component for varying the frequency of the energizing current inversely with respect to the value of the formation conductivity; and means responsive to the operating frequency of the coil system for providing indications directly proportional to formation resistivity.

8. In apparatus for investigating earth formations traversed by a borehole, the combination comprising: a coil system adapted for movement through the borehole and including at least one transmitter coil and at least one receiver coil; means for energizing the transmitter coil with alternating current thereby to induce in the receiver coil a signal component which is proportional to the electrical conductivity of the adjacent formation material; means responsive to the magnitude of this signal component for varying the frequency of the energizing current in inverse proportion to the value of the formation conductivity for maintaining the frequency-conductivity product substantially constant; and means coupled to the coil system for providing indications representative of the formation resistivity.

9. In apparatus for investigating earth formations traversed by a borehole, the combination comprising: a coil system adapted for movement through the borehole and including at least one transmitter coil and at least one receiver coil; means for energizing the transmitter coil with alternating current thereby to induce in the receiver coil a signal component which is dependent on the electrical conductivity of the adjacent formation material as well as the frequency of the energizing current; means for providing a reference signal which is proportional to the frequency of the energizing current; means jointly responsive to both the receiver coil signal component and the reference signal for varying the frequency for the energizing current in inverse proportion to the value of the formation conductivity; and means coupled to the coil system for providing indications representative of the formation resistivity.

10. In apparatus for investigating earth formations traversed by a borehole, the combination comprising: a coil system adapted for movement through the borehole and including at least one transmitter coil and at least one receiver coil; means for energizing the transmitter coil with alternating current thereby to induce in the receiver coil a signal component which is dependent on the electrical conductivity of the adjacent formation material; means responsive to the magnitude of this signal component and operative over a first range of conductivity values for varying the frequency of the energizing current inversely with respect to the conductivity value, the frequency remaining substantially constant over the remaining range of conductivity values; and means coupled to the coil system for providing indications of formation resistance values over both the variable frequency and the constant frequency operating ranges.

11. In apparatus for investigating earth formations traversed by a borehole, the combination comprising: a coil system adapted for movement through the borehole and including at least one transmitter coil and at least one receiver coil; means for energizing the transmitter coil with alternating current thereby to induce in the receiver coil a signal component which is dependent on the electrical conductivity of the adjacent formation material; means responsive to the magnitude of this signal component and operative over a range of high conductivity values for varying the frequency of the energizing current inversely with respect to the conductivity value, the frequency remaining substantially constant and at least equal to the highest frequency of the high range over the remaining range of lower conductivity values; and means coupled to the coil system for providing indications of formation resistance values over both the variable frequency and the constant frequency operating ranges.

12. In apparatus for investigating earth formations traversed by a borehole, the combination comprising: a coil system adapted for movement through the borehole and including at least one transmitter coil and at least one receiver coil; means for energizing the transmitter coil with alternating current thereby to induce in the receiver coil a signal component which is dependent on the electrical conductivity of the adjacent formation material; means responsive to the magnitude of this signal component and operative over a first range of conductivity values for varying the frequency of the energizing current inversely with respect to the conductivity value, the frequency remaining substantially constant over the remaining range of conductivity values; and means coupled to the receiver coil for providing indications of formation resistance values over both the variable frequency and the constant frequency operating ranges.

13. In apparatus for investigating earth formations traversed by a borehole, the combination comprising: a coil system adapted for movement through the borehole and including at least one transmitter coil and at least one receiver coil; means for energizing the transmitter coil with alternating current thereby to induce in the receiver coil a signal component which is dependent on the electrical conductivity of the adjacent formation material; means responsive to the magnitude of this signal component and operative over a first range of conductivity values for varying the frequency of the energizing current inversely with respect to the conductivity value, the frequency remaining substantially constant over the remaining range of conductivity values; signal recorder means; signal reciprocator means; and circuit means for coupling the receiver coil directly to the recorder means when the conductivity value lies in one of the ranges and for coupling the receiver coil to the recorder means by way of the reciprocator means when the conductivity value lies in the other range.

14. In apparatus for investigating earth formations traversed by a borehole, the combination comprising: a coil system adapted for movement through the borehole and including at least one transmitter coil and at least one receiver coil; a variable frequency oscillator adapted to be controlled by a unidirectional signal and coupled to the transmitter coil for energizing such coil with alternating current thereby to induce in the receiver coil a signal component which is dependent on the electrical conductivity of the adjacent formation material; circuit means coupled to the receiver coil and to the variable frequency oscillator for deriving a unidirectional control signal from this receiver coil signal component for varying the oscillator frequency inversely with respect to the value of the formation conductivity; and means coupled to the coil system for providing indications representative of the formation resistivity.

15. In apparatus for investigating earth formations traversed by a borehole, the combination comprising: a coil system adapted for movement through the borehole and including at least one transmitter coil and at least one receiver coil; a variable frequency oscillator adapted to be controlled by a unidirectional signal and coupled to the transmitter coil for energizing such coil with alternating current thereby to induce in the receiver coil a signal component which is dependent on the electrical conductivity of the adjacent formation material; circuit means coupled to the variable frequency oscillator for providing a reference signal representative of the frequency of oscillation thereof; circuit means jointly responsive to both the receiver coil signal component and the reference signal for deriving a unidirectional control signal for varying the oscillator frequency inversely with respect to the value of the formation conductivity; and means coupled to the coil system for providing indications representative of the formation resistivity.

16. In apparatus for investigating earth formations traversed by a borehole, the combination comprising: a coil system adapted for movement through the borehole and including at least one transmitter coil and at least one receiver coil; a variable frequency oscillator adapted to be controlled by a unidirectional signal and coupled to the transmitter coil for energizing such coil with alternating current thereby to induce in the receiver coil a signal component which is dependent on the electrical conductivity of the adjacent formation material; circuit means coupled to the variable frequency oscillator for providing a reference signal representative of the frequency of oscillation thereof; difference circuit means jointly responsive to both the receiver coil signal component and the reference signal for deriving a unidirectional control signal proportional to the difference therebetween for varying the oscillator frequency inversely with respect to the value of the formation conductivity; and means coupled to the coil system for providing indications representative of the formation resistivity.

17. In apparatus for investigating earth formations traversed by a borehole, the combination comprising: a coil system adapted for movement through the borehole and including at least one transmitter coil and at least one receiver coil; a variable frequency oscillator adapted to be controlled by a unidirectional signal and coupled to the transmitter coil for energizing such coil with alternating current thereby to induce in the receiver coil a signal component which is dependent on the electrical conductivity of the adjacent formation material; amplitude detector circuit means responsive to this receiver coil signal component for providing a unidirectional signal proportional thereto; frequency detector circuit means coupled to the variable frequency oscillator for providing a unidirectional reference signal proportional to the frequency of oscillation thereof; a difference circuit jointly responsive to both of these unidirectional signals for deriving a unidirectional control signal for varying the oscillator frequency inversely with respect to the value of the formation conductivity; and means responsive to one of the unidirectional signals providing indications representative of the formation resistivity.

18. In apparatus for investigating earth formations traversed by a borehole, the combination comprising: a coil system adapted for movement through the borehole and including at least one transmitter coil and at least one receiver coil; a variable frequency oscillator adapted to be controlled by a unidirectional signal and coupled to the transmitter coil for energizing such coil with alternating current thereby to induce in the receiver coil a signal component which is dependent on the electrical conductivity of the adjacent formation material; circuit means coupled to the variable frequency oscillator for providing a reference signal representative of the frequency of oscillation thereof; circuit means jointly responsive to both the receiver coil signal component and the reference signal for deriving a unidirectional control signal and operative over a first range of conductivity values for varying the oscillator frequency inversely with respect to the value of the formation conductivity, the oscillator frequency remaining substantially constant over the remaining range of conductivity values; and circuit means responsive to both the receiver coil signal component and the reference signal for providing an output signal which is linear in terms of resistivity over the first conductivity range and which is linear in terms of conductivity over the remaining conductivity range.

19. In apparatus for investigating earth formations traversed by a borehole, the combination comprising: a coil system adapted for movement through the borehole and including at least one transmitter coil and at least one receiver coil; a variable frequency oscillator adapted to be controlled by a unidirectional signal and coupled to the transmitter coil for energizing such coil with alternating current thereby to induce in the receiver coil a signal component which is dependent on the electrical conductivity of the adjacent formation material; circuit means coupled to the variable frequency oscillator for providing a reference signal representative of the frequency of oscillation thereof; circuit means jointly responsive to both the receiver coil signal component and the reference signal for deriving a unidirectional control signal for varying the oscillator frequency inversely with respect to the value of the formation conductivity; circuit means operative over one end of the range of conductivity values for disabling the unidirectional control signal and for instead applying a fixed bias signal to the variable frequency oscillator for maintaining the frequency of oscillator substantially constant; and circuit means responsive to both the unidirectional control signal and the reference signal for providing an output signal which is linear in terms of resistivity over the variable frequency range and which is linear in terms of conductivity over the constant frequency range.

References Cited in the file of this patent

UNITED STATES PATENTS

| 2,220,788 | Lohman | Nov. 5, 1940 |
| 2,438,197 | Wheeler | Mar. 23, 1948 |
| 2,582,315 | Doll | Jan. 15, 1952 |
| 2,788,483 | Doll | Apr. 9, 1957 |
| 2,919,396 | McLaughlin et al. | Dec. 29, 1959 |
| 3,034,042 | Slack | May 8, 1962 |